(12) United States Patent
Hiranaka

(10) Patent No.: US 6,546,140 B1
(45) Date of Patent: Apr. 8, 2003

(54) TRANSMISSION METHOD AND TRANSMISSION APPARATUS

(75) Inventor: Daisuke Hiranaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/437,031

(22) Filed: Nov. 9, 1999

(30) Foreign Application Priority Data

Nov. 10, 1998 (JP) .......................................... 10-319633

(51) Int. Cl.⁷ ................................................. G06K 9/36
(52) U.S. Cl. ...................................................... 382/232
(58) Field of Search ............................. 382/232, 236, 382/238, 240, 242, 248, 250; 358/432, 433; 348/384.1, 394.1–395.1, 400.1–404.1, 407.1–416.1, 420.1–421.1, 425.2, 430.1, 431.1; 375/240.23, 240.24

(56) References Cited

U.S. PATENT DOCUMENTS

| 5,650,860 A | * | 7/1997 | Uz ............................. 358/430 |
| 5,745,178 A | * | 4/1998 | Hartung et al. ............. 348/405 |
| 5,764,293 A | * | 6/1998 | Uz et al. .................... 348/390 |
| 5,892,548 A | * | 4/1999 | Kim ........................... 348/405 |
| 6,011,868 A | * | 1/2000 | Van Den Branden et al. ........................... 382/233 |
| 6,026,232 A | * | 2/2000 | Yogeshwar et al. ......... 395/615 |

* cited by examiner

*Primary Examiner*—Jose L. Couso
(74) *Attorney, Agent, or Firm*—Frommer Lawrence & Haug LLP; William S. Frommer; Bruno Polito

(57) ABSTRACT

A method and apparatus can determine the VBV delay from the bit rate without limiting the encoding time and raising the cost. An image compression-coding apparatus adapted to control the volume of generated codes on the basis of the occupied volume of the VBV buffer at the decoder side comprises an MPEG encoder 13 for computationally determining the cumulative value of the number of input bits of each frame and output as volume of generated information, a number of input bits generating section 16 for computationally determining the theoretical value of the number of input bits from the bit rate, a B(n) counter 15 for replacing the value of the volume of generated information by the theoretical value at the end of a number of frames when the theoretical value of the number of input bits becomes equal to an integer and a VBV delay computing section 14 for computationally determining the VBV delay on the basis of the occupied volume of the VBV buffer from the B(n) counter 15.

10 Claims, 7 Drawing Sheets

TRANSMISSION METHOD AND TRANSMISSION APPARATUS

BACKGROUND OF THE INVENTION

1. Field of the Invention

This invention relates to a method and an apparatus for transmitting compression-coded image signals. More particularly, it relates to a method and apparatus to be suitably used for an image coding apparatus employing a coding system like that of the MPEG (the Moving Picture Image Coding Experts Group) adapted for the encoder to limit the rate of bit generation of a bit stream to a given level in order to make the virtual buffer of the decoder neither overflow nor underflow.

2. Prior Art

According to the MPEG, the encoder is required to control the data volume of a bit stream so as make the virtual buffer (hereinafter referred to as VBV) of the decoder neither overflow nor underflow. Additionally, according to the MPEG, the arithmetic operations for controlling the data volume of a VBV are defined as those using real numbers.

According to the MPEG, vbv_delay (hereinafter referred to as VBV delay) expressing the time period from the start of inputting a frame (frame n) into the VBV to the time when it is removed is defined by formula (1) below provided that the input bit rate of the VBV is constant;

$$\tau(n)=90000*B(n)/R \qquad (1),$$

where τ (n) in formula (1) represents the VBV delay of the VBV for frame n, R represents the input bit rate of the VBV and B (n) represents the volume of the buffer occupied by the VBV immediately before the time when the frame n is removed from the VBV.

For determining the VBV delay through arithmetic operations using formula (1) above, the occupied volume of the buffer B (n) has to be determined accurately.

According to the MPEG, since the arithmetic operations concerning a VBV are defined as those using real numbers as pointed out above, the bit volume to be input to the VBV in a frame period according to the input bit rate R is obtained as a real number. The occupied volume of the buffer B (n) is also obtained as a real number. However, in actual arithmetic operations, the part that undergoing the operation accuracy of arithmetic operations using real numbers will be discarded.

Then, as a result of discarding the part undergoing the operation accuracy of arithmetic operations using real numbers, errors will be gradually accumulated and the actual occupied volume of the buffer B (n) will gradually become smaller than the value obtained by the arithmetic operations using real numbers. As errors are accumulated and the total error gets to a certain level, the VBV delay will no longer be determined correctly relative to the input bit rate R.

Meanwhile, according to the MPEG Standards, the VBV delay is also recursively defined by formula (2) below;

$$R(n)=d(n)/(\tau(n)-\tau(n+1)+t(n+1)-t(n)) \qquad (2),$$

where τ(n) represents the VBV dealy in the VBV of frame (n) and R(n) represents the input bit rate when frame n is input to the VBV, while t(n) represents the time when frame (n) is removed from the VBV and d(n) represents the generated bit volume in frame.

Equation (3) is obtained by adding the values obtained by changing the frame from 0 to n−1 in equation (2) above.

$$\begin{aligned}
R(n)*(\tau(0)-\tau(1)+t(1)-t(0))&=d(0) & \text{for } n=0 \qquad (3)\\
R(n)*(\tau(1)-\tau(2)+t(2)-t(1))&=d(1) & \text{for } n=1\\
\underline{+)\ R(n)*(\tau(n-1)-\tau(n)+tn)-t(n-1))}&=d(n-1) & \text{for } n=n-1\\
R(n)*(\tau(0)-\tau(n)+t(n)-t(0))&=\sum d(n-1)
\end{aligned}$$

If R(n) is a constant equal to R, the VBV delay free from any accumulation of errors as shown in equation (4) below can be obtained from equation (3), although the sum of the generated bit volumes (Σd(n−1)) has to be determined as shown in FIG. 1. In FIG. 1, t(n) represents the time when frame n is removed from the VBV and d(n) represents the generated bit volume in frame n. The total number of bits increases in a manner as indicated by solid line TBN in FIG. 1.

$$\tau(n)=\tau(0)+t(n)-t(0)-\Sigma d(n-1)/R \qquad (4)$$

FIG. 2 shows a schematic block diagram of a general image compression-coding apparatus adapted to determine the VBV delay (vbv_delay) that is free from any accumulation of errors and insert the value of the VBV delay into the header of the output bit stream by utilizing the sum of the generated bit volumes.

Now, the overall operation of the apparatus of FIG. 2.

Referring to FIG. 5, video data are input to terminal 100 on a frame by frame basis and an externally selected bit rate is input to terminal 102.

MPEG encoder 103 is a popular MPEG vidoe encoder which is adapted to compression-encode the video data supplied from the terminal 100 and output the volume of the generated information for each frame. Additionally, it inserts the value of the VBV delay supplied from VBV delay computing section 104 into the header of the bit stream of the next frame and output the bit stream. The bit stream is then output from terminal 101.

Bit counter 105 receives the volume of the generated information on a frame by frame basis and determines the total sum of the generated information by adding the volumes of the generated information of all the frames. More specifically, as the bit counter recognizes that the volume of the generated information from the MPEG encoder 103 is updated (and the volume of the generated information of the next frame is input), it takes in the volume of the generated information of that frame and adds it the current total sum.

VBV delay computing section 104 receives the total sum (count) of the bits of the generated information output from the bit counter 105, computationally determines the value of the VBV delay, using formula (5) below and outputs the obtained value;

$$VDR=IVD+EFN*FI-TBN/BR \text{ and}$$

$$VD=90000*VDR \qquad (5),$$

where FI (frame_inverval) represents the frame interval of each frame expressed in terms of number of seconds, EFN (encoded_frame_number) represents the number of frames at the time when the encoding is terminated and TBN (total_bit_number) represents the total sum of the volumes of the generated information input by the bit counter 105, whereas IVD represents the initial value of the VBV delay expressed in terms of number of seconds, BR (bitrate) represents the externally selected bit rate and VDR represents the computationally obtained VBV delay, VD representing the output of the VBV delay output from the VBV delay computing section 104.

From formula (5), the VBV delay (VD) that the VBV computing section 104 outputs to the MPEG encoder 103 is equal to the value obtained by multiplying the VDR value per second with 90000.

However, with a known image compression-coding apparatus as shown in FIG. 2, the VBV delay can be determined only within the total sum of the volumes (total_bit_number) of the generated information that the bit counter 105 can hold.

On the other hand, a huge register will have to be arranged within the bit counter 105 to guarantee a sufficient period of time for the encoding operation to count the number of bits representing the volume of the generated information. This entails large cost and the encoding operation cannot be continued beyond the time period corresponding to the capacity of the register.

SUMMARY OF THE INVENTION

In view of the above circumstances, it is therefore the object of the present to provide a transmission method and a transmission apparatus adapted to determined the VBV delay (vbv_delay) on the basis of bit late without limiting the encoding time and raising the cost.

A transmission method and a transmission apparatus according to the invention are adapted to control the volume of generated codes on the basis of the occupied volume of the virtual buffer at the side of the reception apparatus. They can achieve the above object by computing the cumulative value of the number of the input bits of all the frames and the theoretical value of the number of the input bits from the bit rate and replacing the cumulative value by an integer value close to the theoretical value when the error between the theoretical value and the cumulative value exceeds a predetermined value.

It will be clear from the above description that, according to the invention, when transmitting a signal by controlling the volume of the generated codes on the basis of the occupied volume of the virtual buffer at the side of the reception apparatus, the cumulative value of the number input bits of all the frames and the theoretical value of the number of the input bits are computationally determined and the cumulative value is replaced by the theoretical value at every number of frames where the theoretical value is expressed by an integer. Then, it is possible to determine the buffer delay (vbv_delay) from the bit rate without limiting the encoding time and raising the cost.

Additionally, according to the invention, when the cumulative value of the number input bits of all the frames and the theoretical value of the number of the input bits are computationally determined and the difference between the theoretical value and the cumulative value exceeds a predetermined level, the cumulative value is replaced by an integer close to the theoretical value. Then, it is also possible to determine the buffer delay (vbv_delay) from the bit rate without limiting the encoding time and raising the cost.

DETAILED DESCRIPTION OF THE INVENTION

Now, the present invention will be described in greater detail by referring to the accompanying drawings that illustrate preferred embodiments of the invention.

Figure 3:
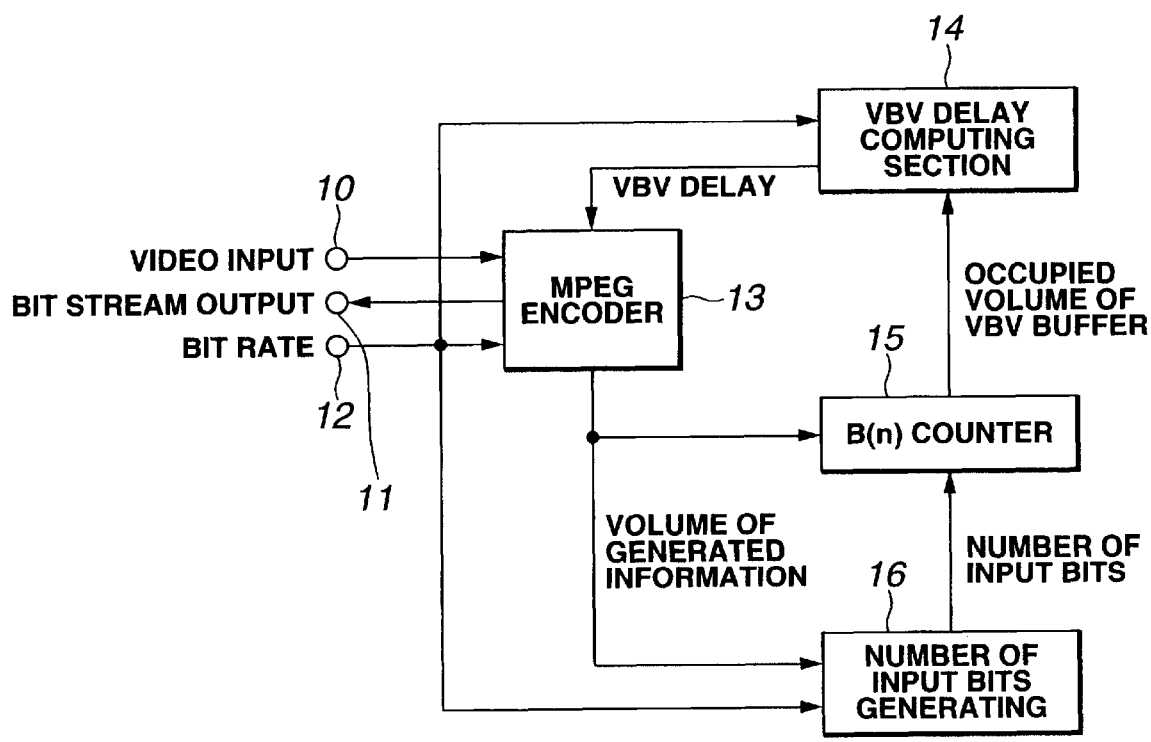
FIG. 3 is a schematic block diagram of an embodiment of image compression-coding apparatus to which a transmission method and a transmission apparatus according to the invention are applied.

FIG. 3 is a schematic block diagram of a first embodiment of image compression-coding apparatus to which a transmission method and a transmission apparatus according to the invention are applied. Before specifically describing the configuration of the apparatus of FIG. 3, the basic theory underlying the present invention for determining the VBV delay (vbv_delay) from the bit rate without limiting the encoding time and raising the cost will be described by referring to FIGS. 4 through 6.

For example, when the bit rate is equal to 1 Mbps, the frate rate is equal to 30000/1001 ($\approx$29.97) Hz, the number of bits input to the VBV within a frame period is expressed by formula (6) below.

$$1000000/(30000/1001)=100100/3=33366.6666666\ldots \qquad (6)$$

Figure 1:
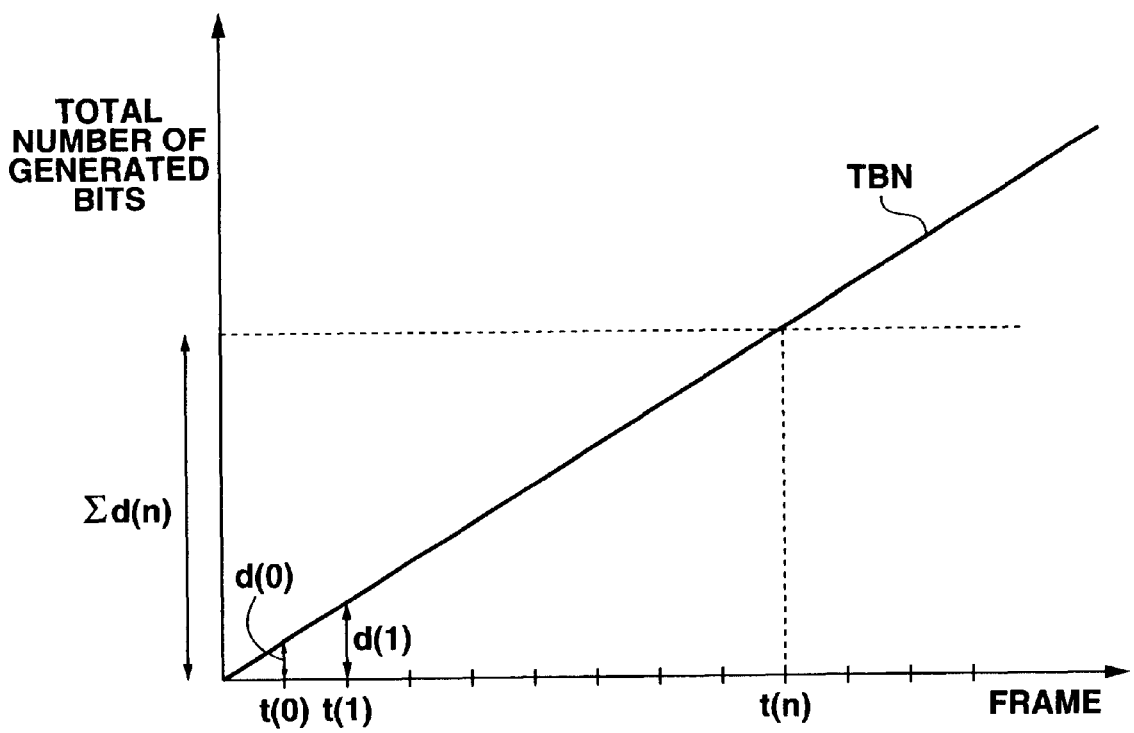
FIG. 1 is a schematic illustration of how the sum of generated bits is determined for the purpose of the present invention.
Figure 2:
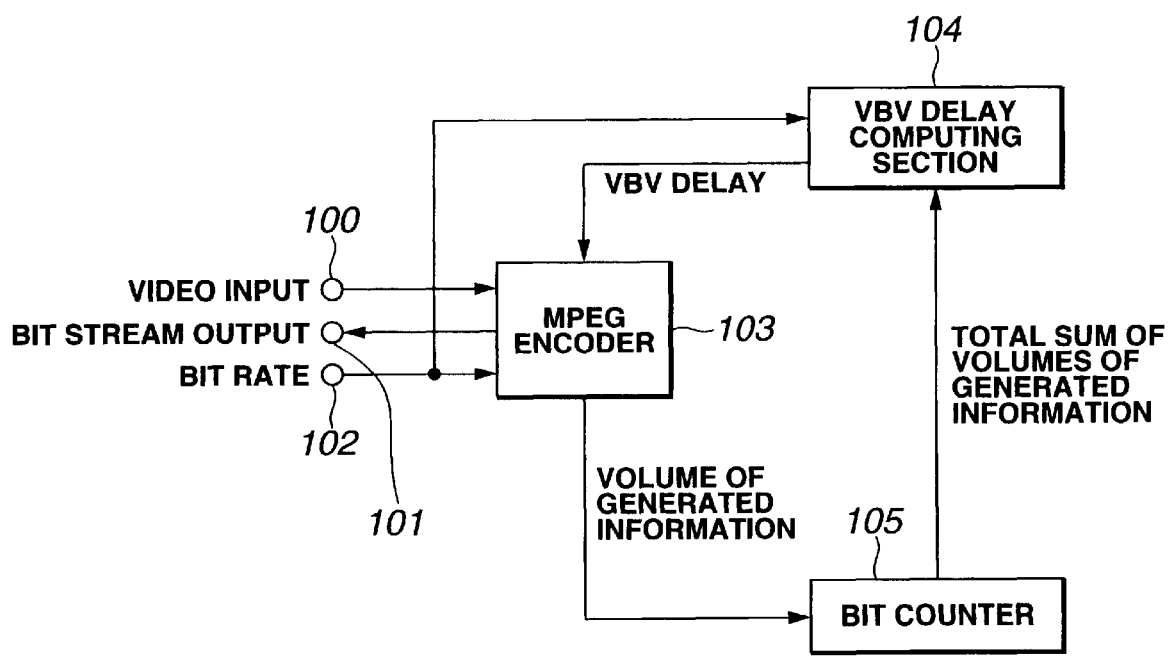
FIG. 2 is a schematic block diagram of a known image compression-coding apparatus for determining the sum of generated bits.

When the bits are input for each frame by using the above formula, the total number of the input bits will show an ideal line that is indicated by solid line IIL (ideal input line) in FIG. 2.

Figure 4:
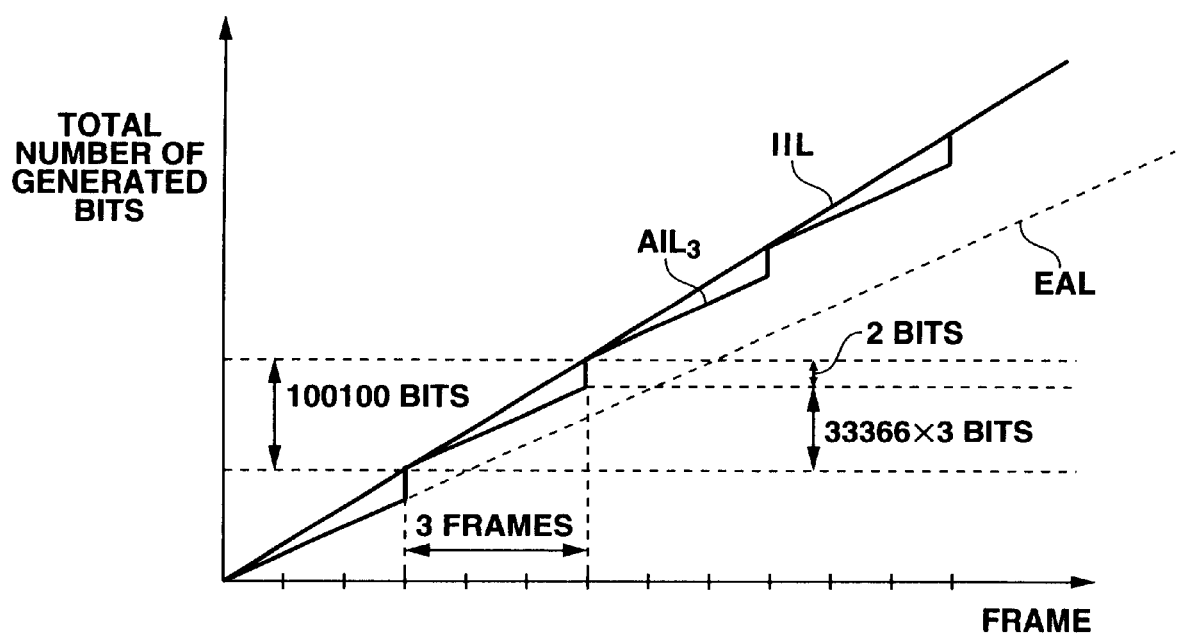
FIG. 4 is a schematic illustration of the technique for computationally determining the VBV delay used by the first embodiment of the invention.

On the other hand, if a rounded-off figure of 33366 is used to make the number of input bits of a frame equal to an integer on the basis of the number of bits (33366.6666666) determined by formula (6), the total number of the actually input bits will show a line that is indicated by broken line EAL (error accumulate line) in FIG. 4 to gradually raise the cumulative error.

However, no rise of cumulative error will occur if the number of input bits is made equal to 100100 for 3 frames as shown in FIG. 4.

Thus, with the first embodiment of the invention, the number of input bits is corrected by every 3 frames to eliminate the error by replacing the number of. More specifically, the difference between the correct number of input bits and the actual number of input bits is determined at the end of every three frames and added to the number of the input bits to offset the error.

Using actual figures, the difference between 100100 bits or the correct number of input bits for three frames and 100098 bits (33366*3) or the number of bits actually input for the same three frames is equal to 2 as shown by formula 7 below.

$$100100-33366*3=2 \qquad (7)$$

Therefore, with the first embodiment of the invention, 2 is added to the number of bits obtained for three framed by discarding the decimal fraction from the number of bits of each of the three frames to obtain (33366+2) for the number of input bits for the three frames. In FIG. 4, solid line $AIL_3$ (actual input line) indicates the number of actually input bits of the first embodiment.

Generally speaking, as the MPEG defines the bit rate (externally selected bit rate) to be equal to 400 bps, the number of bits input for each frame will be expressed by formula (8) below.

$$(BR/400)*400/(30000/1001)=(BR/400)*1001/75 \tag{8}$$

The above equation indicates that the total number of bits for 75 frames is equal to $(BR/400)*1001$. This number of bits will be expressed by $IBR_{75F}$ (input_bits_real_75 frames) hereinafter. Note that the figure of 75 corresponds to $(30000/1001 \approx 29.97)$ Hz and hence is determined as a function of frame rate. In other words, if the frame rate is 25 Hz or 30 Hz, the number of frames to be used will be expressed by formula (9) or (10) below, namely;

$$(BR/400)*400/30=(BR/400)*40/3 \tag{9 or}$$

$$(BR/400)*400/25=(BR/400)*16/1 \tag{10}$$

where BR represents the external selected bit rate.

Figure 5:
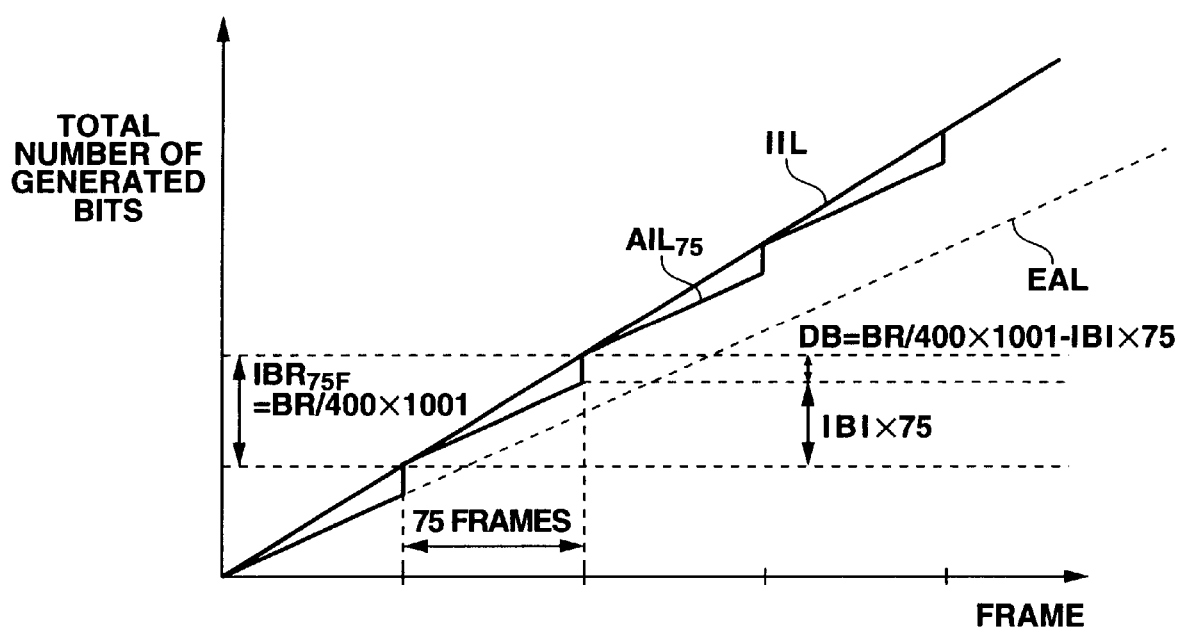
FIG. 5 is a schematic illustration of the technique for computationally determining the VBV delay used by a second embodiment of the invention.

FIG. 5 is a graph similar to FIG. 4 but showing the number of input bits for 75 frames with a frame rate is $(30000/1001 \approx 29.97)$ Hz. In the case of FIG. 5, solid line $AIL_{75}$ (actual input line) indicates the number of actually input bits of the second embodiment.

Thus, with the second embodiment, the number of actually input bits for 75 frames is replaced by the correct number of bits. In other words, the difference between the correct number of input bits and the actual number of input bits is determined at the end of every seventy five frames and added to the number of the input bits to offset the error and the error accumulated in 75 frames is determined by formula (11) below.

$$DB=IBR_{75F}-IBI*75 \tag{11},$$

where IBI (input_bits_int) represents the integer obtained by dividing $(BR/400)*1001$ by 75 and counting fractions of 5 and over as a unit and disregarding the rest of the product and BR (diff_bits) represents the cumulative error of the 75 frames.

Thus, with the second embodiment, the error is eliminated by using (IBI+DB) for the number of input bits for 75 frames.

It will be appreciated that, while no accumulation of errors occurs with this second embodiment, the occupied volume of the buffer B(n) differs significantly from the correct volume at the 75th frame so that the VBV delay may show an error depending on the bit rate.

For instance, if the bit rate is equal to 1 Mbps, $IBR_{75F}$ is determined by formula (12) below.

$$(1000000/400)*1001=2502500 \text{ bits} \tag{12}$$

However, the number of input bits for a frame (IBI) as used for determining the VBV delay of a frame is multiplied by 75 for 75 frames, the cumulative error (DB) of the 75 frames will show a deviation of 25 bits as indicated by formulas (13), (14) and (15) below.

$$IBI=33367 \approx (1000000/400)*1001/75 \tag{13}$$

$$IBI*75=2502525 \text{ bits} \tag{14}$$

$$DB=2502525-2502500=25 \text{ bits} \tag{15}$$

Formula (16) below is obtained by using this value for formula (1) for determining the VBV delay.

$$90000*B(n)/BR=90000*25/1000000=2.25 \tag{16}$$

It will be seen from formula (16) that the difference in the occupied volume of the buffer B(n) gives rise to a deviation not smaller than 2 for the VBV delay.

Figure 6:
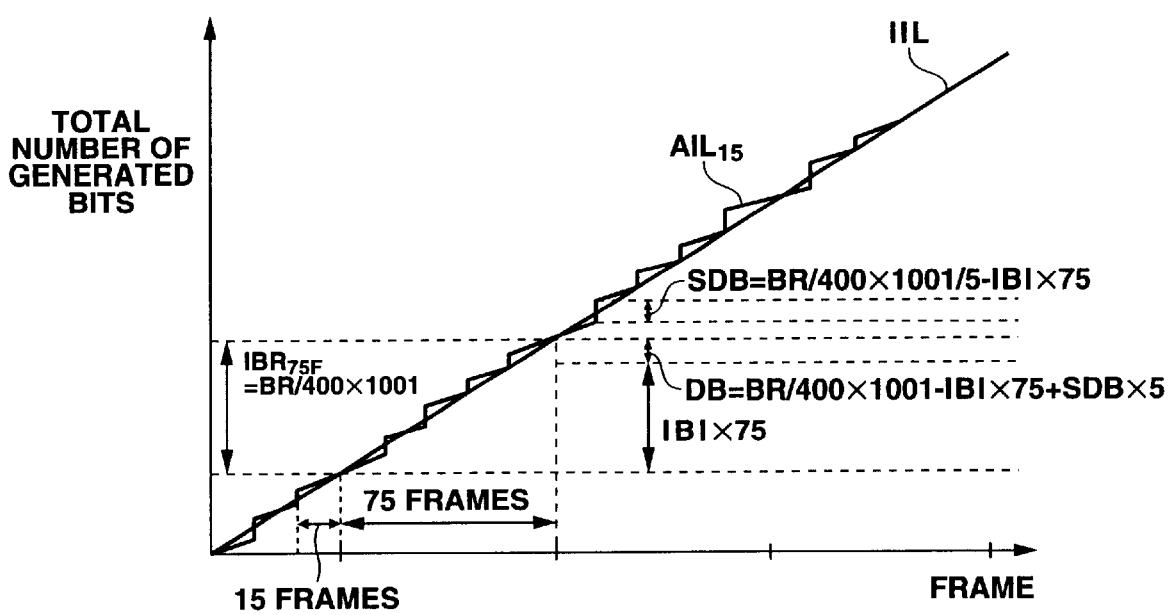
FIG. 6 is a schematic illustration of the technique for computationally determining the VBV delay used by a third embodiment of the invention.

In view of this fact, with a third embodiment of the invention, the cumulative error is decreased by every 15 frames in a period of 75 frames as shown in FIG. 6, which is similar to FIGS. 4 and 5. In FIG. 16, solid line $AIL1_{5F}$ indicates the number of input bits for the third embodiment.

The difference between the value obtained by dividing $IBR_{75F}$ by 75 and counting fractions of 5 and over as a unit and disregarding the rest of the product and the sum of IBIs for 15 frames is expressed formula (17) below;

$$SDB=IBR_{75F}/5-IBI*15 \tag{17},$$

where SDB (sub_diff_bits) represents the above difference.

When the difference (SDB) is added to the number of input bits (IBI) for 15 frames (IBI+SDB), DB (diff_bits) is expressed by formula (18) below.

$$DB=IBR_{75F}-IBI*75+SDB*5 \tag{18}$$

Then, as described above, the number of bits of DB (diff_bits) is obtained by formulas (19) and (20) below.

$$SDB=2502500/5-33367*15=-5 \tag{19}$$

$$DB=2502500-2502525+(-5)*5=0 \tag{20}$$

Since DB (diff_bits) is equal to 0 as shown in formula (20), no deviation occurs for the 75 frames. SDB represents the largest deviation of the occupied volume of the buffer B(n). This deviation affects the VBV in a manner as expressed by formula (21) below.

$$90000*B(n)/BR=90000*5/1000000=0.45 \tag{21}$$

It will be appreciated from formula (21) that any VBV deviation would not appear.

Meanwhile, the deviation of the occupied volume of the buffer B(n) affects to a large extent when the bit rate is small.

Now, the smallest bit rate that does not give rise a deviation equal to or greater than 1 to the VBV delay can be determined in a manner as described below.

Since the difference between IBI and the actual number of input bits is 0.5 at most for a frame, the value of SDB representing the deviation for 15 frames is $7.5 \approx 8$ at most.

Formulas (22) and (23) show the bit rate for giving rise to a deviation of 1 for the VBV delay. Therefore, no deviation occurs to the VBV delay when the bit rate is not smaller than 0.72 Mbps.

$$90000*8/BR=1 \tag{22}$$

$$BR=90000*8=720000 \tag{23}$$

If the bit rate is lower than this level, any VBV delay can also be eliminated by modifying the error correcting operation that occurs once for every 15 frames so as to make it occur once every 5 or 4 frames.

As described above, with this embodiment, the occupied volume B(n) of the VBV is updated by every frame to determine the VBV delay from the bit rate by using formula (1) above. Additionally, since it is not necessary to use the total sum of the volumes of the generated information, there is no limitation to the encoding period.

Any of the above embodiments is applicable to the image compression-coding apparatus of FIG. 3 to determine the VBV delay from the externally selected bit rate. Additionally, the information on the VBV delay can be added to the bit stream by using the apparatus of FIG. 3.

Now, the configuration and the flow of operation of the apparatus of FIG. 3 will be described below.

Referring to FIG. 3, the video data of each frame is entered to terminal 10 and the externally selected bit rate is input to terminal 12.

MPEG encoder 13 is a general type MPEG encoder and compression-codes the video data supplied from the terminal 10 on a frame by frame basis and outputs the volume of generated information to show the number of codes of each frame. It also inserts the VBV delay it receives from VBV delay computing section 14 into the head of the bit stream of the next frame. The bit stream is then output from terminal 11.

Referring still to FIG. 3, B(n) counter 15 hold the count value representing the occupied volume B(n) of the VBV. The occupied volume B(n) of the VBV is set to be equal to the buffer size*0.75. Each time the volume of generated information of each frame output from the MPEG encoder 13 is updated (and hence the volume of generated information of the next frame is input), the B(n) counter 15 takes in said volume of generated information and subtracts it from the occupied volume of the buffer B(n) it currently holds (and hence counts down). The B(n) counter 15 also takes in the volume of generated bits from number of input bits generating section 16, which will be described hereinafter, and adds it to said occupied volume of the buffer B(n) (to count up).

The occupied volume of the buffer B(n) obtained as a result of the above counting up or counting down operation is then output to VBV delay computing section 14.

Figure 7:
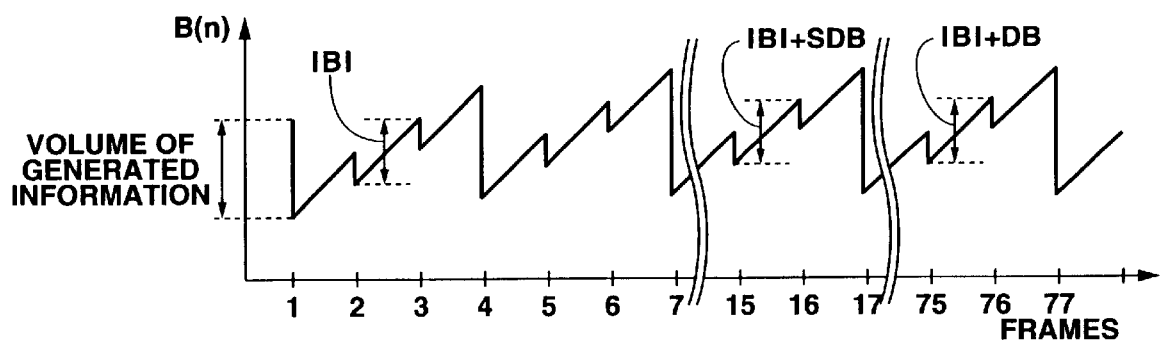
FIG. 7 is a schematic illustration of the change that can occur in the occupied volume of the buffer B(n) as determined by the buffer counter B(n) of any of the embodiments of image compression-coding apparatus according to the invention.

FIG. 7 shows as example how the occupied volume of the buffer B(n) changes as the reading of the B(n) counter 15.

The VBV delay computing section 14 receives the occupied volume of the buffer B(n) output from the B(n) counter 15 and performs an arithmetic operation, using formula (24) below according to the MPEG Standards. It then outputs the obtained VBV delay. For the first frame, it outputs the VBV delay determined from the initial value of the occupied volume of the buffer B(n) as output from the B(n) counter 15;

$$VD=90000*B(n)/BR \quad (24),$$

where VD represents the VBV delay and BR represents the externally selected bit rate as expressed in terms of the number of bits per second, which is exactly divisible by 4000 bps.

The number of input bits generating section 16 computationally determines the number of input bits to be transmitted to said B(n) counter by using the volume of generated information sent from the MPEG encoder 13 and the externally selected bit rate sent from the terminal 12.

Now, the number of input bits generating section 16 will be described in detail. Firstly, the variables to be used for describing its operation will be defined.

Variable EFC (encoded_frame_counter) represents the number of encoded frames. This variable EFC is incremented when the volume of generated information from the encoder is updated.

Variable RC (reset_count) represents the period of negating the cumulative error of the reading of the B(n) counter 15 as expressed in terms of the number of frames and takes a value selected in a manner as shown below as a function of frame rate.

75 when the frame rate is equal to (30000/1001) Hz 3 when the frame rate is equal to 30 Hz when the frame rate is equal to 25 Hz.

Variable BB (base_bit) represents the number of bits per 400 bps input to the VBV in a frame period of the reset count (reset_count). It takes a value selected in a manner as described below as a function of frame rate.

1001 when the frame rate is equal to 30000/1001)Hz 40 when the frame rate is equal to 30 Hz 16 when the frame rate is equal to 25 Hz Variable IBI (input_bits_int) represents the number of bits input to the VBV in a frame period, counting fractions of 5 and over as a unit and disregarding the rest and expressed by formula (25) below;

$$IBI=(int)((int)(BR/400)*BB/RC) \quad (25),$$

where int represents an integer, RC represents the reset count (reset_count) and BR represents the externally selected bit rate.

Variable DB (diff_bits) represents the error in the number of bits input to the VBV to be used in the frame period of the reset count and expressed by formula (26) below.

$$DB=(int)(BR/400)*BB-IBI*RC+SDB*5 \quad (26)$$

Variable SDB (sub_diff_bits) represents the error in the number of bits input to the VBV in 5 frame periods when the frame rate is equal to (30000/1001) Hz and takes a value as described below.

0 when the frame rate is 30 Hz or 25 Hz a value expressed by formula (27) below when the frame rate is (30000/1001) Hz $$SDB=(int)(BR/400)*BB-5-IBI*15 \quad (27)$$

Now, the operation of the number of input bits generating section 16 will be described below by referring to the above defined variables.

When the volume of generated information from the MPEG encoder 13 is updated (and hence the volume of generated information of the next frame is input), the variable EFC is incremented and the number of input bits to be output is changed. While the variable IBI is output as the number of input bits normally, the value of IBI+DF is output as the number of input bits when the variable EFC becomes equal to the variable RC multiplied by an integer less 1. When the frame rate is equal to (30000/1001≈29.97) Hz, the value of IBI+DB is output as the number of input bits when the variable EFC becomes equal to 15 multiplied by an integer less 1.

The operation of the number of input bits generating section 16 can be expressed by means of the C language in a manner as shown below. In the expression below by means of the C language, generated_bits_number represents the volume of generated information, input_bits represents the number of input bits and frame_rate represents the frame rate, whereas encoded_frame_counter represents the varialbe EFC, reset_counter represent the variable RC, base_bits represents the varialbe BB and input_bits_int, diff_bits and sub_diff_bits respectively represent the variable IBI, the variable DB and the variable SDB.

```
while (1) {
   if (generated_bitrs_number is updated) { encoded_
      frame_counter++;
   input_bits=input_bits_int;
   if (encoded_frame_counter % reset_count==reset_
      count-1) {input_bits+=diff_bits;
   }
   if (frame_rate==(30000/1001) && encoded_frame_
      counter % 15==14){
   input_bits+=sub_diff_bits;
}
}
}
```

What is claimed is:

1. A transmission method adapted to control the volume of generated codes on the basis of the occupied volume of the virtual buffer at the side of the reception apparatus, comprising steps of;

computing the cumulative value of the number of the input bits of each frame;

computing the theoretical value of the number of the input bits from the bit rate, said theoretical value being a real number value; and replacing said cumulative value by said theoretical value at the end of a number of frames when said theoretical value is equal to an integer value.

2. A transmission method according to claim 1, wherein a bit stream obtained by compression-coding an image signal on a frame by frame basis is transmitted.

3. A transmission method adapted to control the volume of generated codes on the basis of the occupied volume of the virtual buffer at the side of the reception apparatus, comprising steps of;

computing the cumulative value of the number of the input bits of each frame;

computing the theoretical value of the number of the input bits from the bit rate, said theoretical value being a real number value; and replacing said cumulative value by an integer close to said theoretical value when the difference between said theoretical value and said cumulative value exceeds a predetermined value.

4. A transmission method according to claim 3, wherein said cumulative value is replaced by an integer close to said theoretical value periodically at the end of a number of frames obtained by equally dividing the number of frames where said theoretical value is an integer.

5. A transmission method according to claim 3, wherein a bit stream obtained by compression-coding an image signal on a frame by frame basis is transmitted.

6. A transmission apparatus adapted to control the volume of generated codes on the basis of the occupied volume of the virtual buffer at the side of the reception apparatus, comprising;

a cumulative value computing means for computing the cumulative value of the number of the input bits of each frame;

a theoretical value computing means for computing the theoretical value of the number of the input bits from the bit rate, said theoretical value being a real number value; and a replacing means for replacing said cumulative value by said theoretical value at the end of a number of frames when said theoretical value is equal to an integer value.

7. A transmission apparatus according to claim 6, wherein a bit stream obtained by compression-coding an image signal on a frame by frame basis is transmitted.

8. A transmission apparatus adapted to control the volume of generated codes on the basis of the occupied volume of the virtual buffer at the side of the reception apparatus, comprising;

a cumulative value computing means for computing the cumulative value of the number of the input bits of each frame;

a theoretical value computing means for computing the theoretical value of the number of the input bits from the bit rate, said theoretical value being a real number value; and a replacing means for replacing said cumulative value by an integer close to said theoretical value when the difference between said theoretical value and said cumulative value exceeds a predetermined value.

9. A transmission apparatus according to claim 8, wherein said cumulative value is replaced by an integer close to said theoretical value periodically at the end of a number of frames obtained by equally dividing the number of frames where said theoretical value is an integer.

10. A transmission apparatus according to claim 8, wherein a bit stream obtained by compression-coding an image signal on a frame by frame basis is transmitted.

* * * * *